United States Patent [19]

Goto et al.

[11] Patent Number: 4,999,726
[45] Date of Patent: Mar. 12, 1991

[54] MAGNETIC CORE FOR FLYING-TYPE COMPOSITE MAGNETIC HEAD

[75] Inventors: Ryo Goto; Tadafumi Tomitani, both of Mouka; Fumio Nitanda, Fukaya; Manabu Toyoda, Mouka; Makoto Ushijima, Tokyo, all of Japan

[73] Assignee: Hitachi Metals, Ltd., Tokyo, Japan

[21] Appl. No.: 329,324

[22] Filed: Mar. 27, 1989

[30] Foreign Application Priority Data

Mar. 29, 1988 [JP] Japan ................... 63-75258

[51] Int. Cl.$^5$ ............................................. G11B 5/235
[52] U.S. Cl. ................................. 360/120; 360/119; 360/125
[58] Field of Search ................. 360/120, 119, 121, 125

[56] References Cited

U.S. PATENT DOCUMENTS

| 4,768,118 | 8/1988 | Kuriyama | 360/121 |
| 4,794,483 | 12/1988 | Naitoh et al. | 360/120 |
| 4,796,133 | 1/1989 | Kuriyama | 360/112 |
| 4,821,406 | 4/1989 | Ota | 360/120 X |
| 4,854,035 | 8/1989 | Gukkenberger et al. | 360/120 X |

FOREIGN PATENT DOCUMENTS

| 54-105512 | 8/1979 | Japan | 360/120 |
| 61-239411 | 10/1986 | Japan | 360/120 |

*Primary Examiner*—John H. Wolff

[57] ABSTRACT

A magnetic core for a flying-type composite magnetic head, including a pair of core pieces, a glass portion for bonding the core pieces, and a thin magnetic metal layer of Fe-Al-Si alloys formed on at least one of opposing surfaces of the core pieces. The thin magnetic metal layer extends by 10 μm or more from an apex of a magnetic gap defined by the core pieces and has an inner end existing by 15 μm or more inside an inner end of the bonding glass portion.

4 Claims, 5 Drawing Sheets

FIG. 9
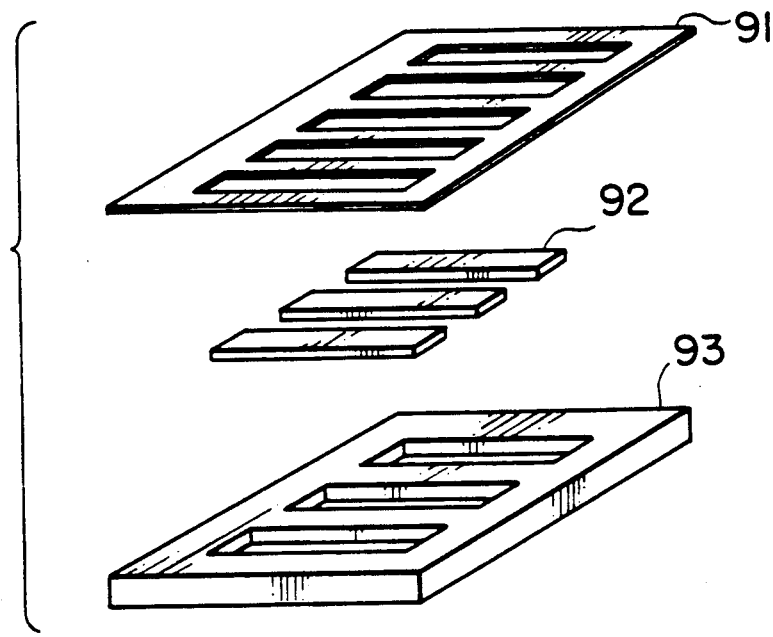
FIG. 10
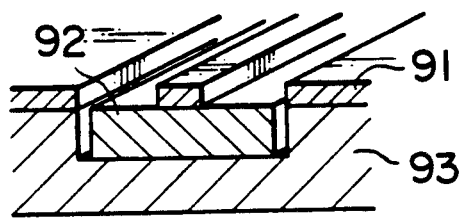
FIG. 11(a)
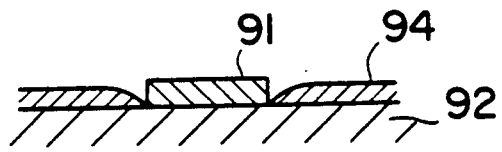
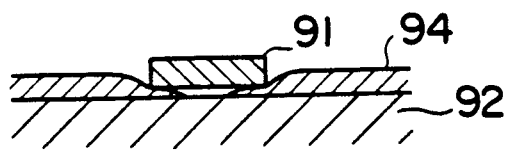
FIG. 11(b)

MAGNETIC CORE FOR FLYING-TYPE COMPOSITE MAGNETIC HEAD

BACKGROUND OF THE INVENTION

The present invention relates to a magnetic core for a flying-type composite magnetic head for use in a magnetic disk drive in such a manner that it is slightly floating over a magnetic recording medium.

As magnetic heads used for writing and reading information in magnetic disk apparatuses, flying-type magnetic heads as shown in U.S. Pat. No. 3,823,416 and Japanese Patent Publication No. 57-569 are widely used. Such a flying-type magnetic head is constituted by a slider, a tail end of which is provided with a magnetic gap, and the overall slider body is constituted by an oxide-type magnetic material with high permeability.

The flying-type magnetic head is in light contact with a magnetic disk by a spring force when the magnetic disk is stationary, but when the magnetic disk is rotating, a flow of the air over the magnetic disk exerts an upward force to a lower surface of the slider, whereby the magnetic head floats over the magnetic disk. When the magnetic disk starts to rotate or stops, the magnetic head comes into sliding contact with the magnetic disk. The contact condition of the magnetic head with the magnetic disk when the magnetic disk is stopped will be explained in detail. First, the flow of surface air becomes gradually slow when the rotation speed of the magnetic disk is reduced. And when the magnetic head loses its floating force, it collides with the disk surface and jumps up by its reaction and then falls onto the disk surface again. Such movement is repeated and the magnetic head slides on the disk to finally stop. Accordingly, the magnetic head should withstand shocks at the time of start and stop, and such characteristics are sometimes called CSS characteristics (contact start stop characteristics).

Flying-type magnetic heads conventionally were constituted by ferrite which is an oxide-type magnetic material with high permeability have relatively good CSS characteristics. However, but the ferrite has a small saturation magnetic flux density, so that sufficiently high recording densities cannot be achieved to recording media having high coercive forces. Specifically, even with Mn-Zn ferrite having a relatively high saturation magnetic flux density Bs, its Bs is at most 5000 G or so.

It was then found that to achieve Bs of 8000 G or more, a magnetic head is desirably provided with a thin magnetic metal layer in its magnetic gap. For instance, Japanese Patent Laid-Open No. 58-14311 proposes a flying-type magnetic head composed of ferrite and provided with a magnetic metal layer with high saturation magnetic flux density only in a magnetic gap portion thereof. However, in this magnetic head, a magnetic transformation part has large inductance after provided with coil windings, so that it has low resonance frequency. This means that it is disadvantageous in recording and reproducing at high frequency. Here, the large inductance is due to the fact that the overall magnetic head is composed of a magnetic material. Accordingly, to achieve low inductance, a magnetic circuit should be made small. From this point of view, U.S. Pat. No. 3,562,444 discloses a flying-type composite magnetic head in which a magnetic core is embedded in and fixed to a non-magnetic slider, without constituting the entire magnetic head with a magnetic material.

Further, the present inventors proposed in Japanese Patent Laid-Open No. 61-199219 a flying-type magnetic head in which a magnetic core is embedded in a non-magnetic slider.

It has been found from the above that to obtain a flying-type composite magnetic head having good recording characteristics to high-coercive force recording media and small inductance, a magnetic core should be constituted by a Mn-Zn ferrite substrate with a high saturation magnetic flux density Bs and coated with a thin magnetic layer having high Bs in its magnetic gap portion, and such magnetic core should be embedded in a non-magnetic slider. An example of such magnetic heads is shown in Japanese Patent Laid-Open No. 60-154310 by the present inventors.

Further, Japanese Patent Laid-Open No. 61-199217 proposed a magnetic head in which a magnetic gap portion of a magnetic core is in an X-shape. In this X-shaped magnetic gap, however, each core piece has a sharp tip portion coated with a high-Bs magnetic thin layer and ground in parallel for defining the magnetic gap. Accordingly, to obtain a desired track width, the high-Bs magnetic thin layer should have a somewhat large thickness.

Proposed as a magnetic core free from such restriction is a so-called parallel-type magnetic core constituted by a pair of core pieces having flat opposing surfaces and having a track surface provided with a notch for restricting a track width of the magnetic core. The parallel-type magnetic core is generally constituted by an I-shaped core piece and a C-shaped core piece, and the I-shaped core piece is usually provided with a thin magnetic metal layer made of Fe-A±-Si, etc. The parallel-type magnetic core is advantageous in that a magnetic gap is easily formed.

However, since the thin magnetic metal layer and the core piece generally have largely different thermal expansion coefficients, the thin magnetic metal layer tends to peel off from the core piece, or the core pieces are likely to be cracked due to internal stress in a bonding portion with the thin magnetic layer, when the core pieces are bonded with each other by glass, or when the magnetic core is fixed to a non-magnetic slider. Further, when a thin magnetic metal layer is formed in a window portion of the magnetic core for winding, the thin magnetic metal layer is likely to peel off at the time of winding.

Various attempts have been made to solve the above problems. For instance, to prevent the problems of peeling and cracking due to the difference in thermal coefficient between the core pieces and thin magnetic metal layer, the thinning of the metal layer is considered. However, it is not preferable to make the metal layer extremely thin because it leads to the deterioration of its magnetic properties. Further, it may be possible to form the thin magnetic metal layer only in a magnetic gap and a back gap, but it is generally extremely difficult to form the thin magnetic metal layer only in the magnetic gap portion and the back gap portion of an extremely small magnetic core by a sputtering method with a high precision.

In addition, the formation of the thin magnetic metal layer partially on one core piece of the magnetic core is usually conducted by using a mask shown in FIG. 9. The mask 91 has a structure as shown in FIG. 9, and it covers a ferrite core block 92 contained in a holder 93.

FIG. 10 shows in detail the mask 91 arranged on the core block 92 contained in the holder 93. In this state, the thin magnetic metal layer is formed by sputtering. Thus, as shown in FIGS. 11 (a) and (b), end portions of the resulting thin layer 94 become thin due to a shadow effect, or due to the phenomenon that the mask 91 is raised slightly. These thinned or tapered end portions of the thin layer 94 cause the problem that a magnetic gap length becomes larger toward the end portions of the thin layer, thereby changing the characteristics of the magnetic core.

SUMMARY OF THE INVENTION

Accordingly, an object of the present invention is to provide a magnetic core for a flying-type composite magnetic head which has thin magnetic metal layers free from the above problems.

As a result of intense research in view of the above object, the inventors have found that by restricting the length of the thin magnetic metal layer formed in the magnetic gap to a particular range, it is possible to provide a magnetic core with good characteristics without suffering from the peeling of the thin magnetic metal layer and cracking of the core pieces. The present invention is based upon this finding.

Thus, the magnetic core for a flying-type composite magnetic head according to the present invention comprises a pair of core pieces; a glass portion for bonding the pair of core pieces; a window defined by the pair of core pieces, a magnetic gap defined by the pain of core pieces on one side of said window. and a thin magnetic metal layer formed on at least one of opposing surfaces of the core pieces from an outer end of the magnetic gap to the window the thin magnetic metal layer extending by 10 μm or more beyond an inner end of the magnetic gap and terminating by 15 μm or more inside an inner end of the bonding glass portion. The magnetic core may have a second thin magnetic metal layer formed on at least one of opposing surfaces of the core pieces in a back gap defined by pair of core pieces on the other side of said window, the second magnetic metal layer having an inner end existing between almost 50 μm inside an inner end of the back gap and at most 100 μm from the inner end of the back gap.

In the case of sputtering by using a usual mask, the resulting thin magnetic metal layer has end portions whose thickness is decreasing gradually, and each of the gradually thinning tapered) end portions has a length of 10 μm or so. Accordingly, to prevent the deterioration of characteristics due to the thinning (tapering) of the metal layer, the thin magnetic metal layer is required to be made longer in the magnetic gap. At the same time, the thin magnetic metal layer extending from each gap should have a length not exceeding that at which the thin layer starts to peel off. From this aspect, by restricting the extending length of the thin magnetic metal layers in the desired range as described above, it is possible to prevent the peeling of the thin layers and the cracking of the core pieces, thereby providing the resulting magnetic head with good characteristics.

BRIEF DESCRIPTION OF THE DRAWINGS

FIG. 9 is a perspective view showing a mask means for forming a thin magnetic metal layer partially on core blocks;

FIG. 10 is a view showing a mask arranged on each core block; and

FIGS. 11 (a) and 11 (b) are cross-sectional views showing a thin magnetic metal layer formed on a core block covered by a mask.

DETAILED DESCRIPTION OF THE PREFERRED EMBODIMENTS

The present invention will be explained in detail referring to the attached drawings.

Figure 1:
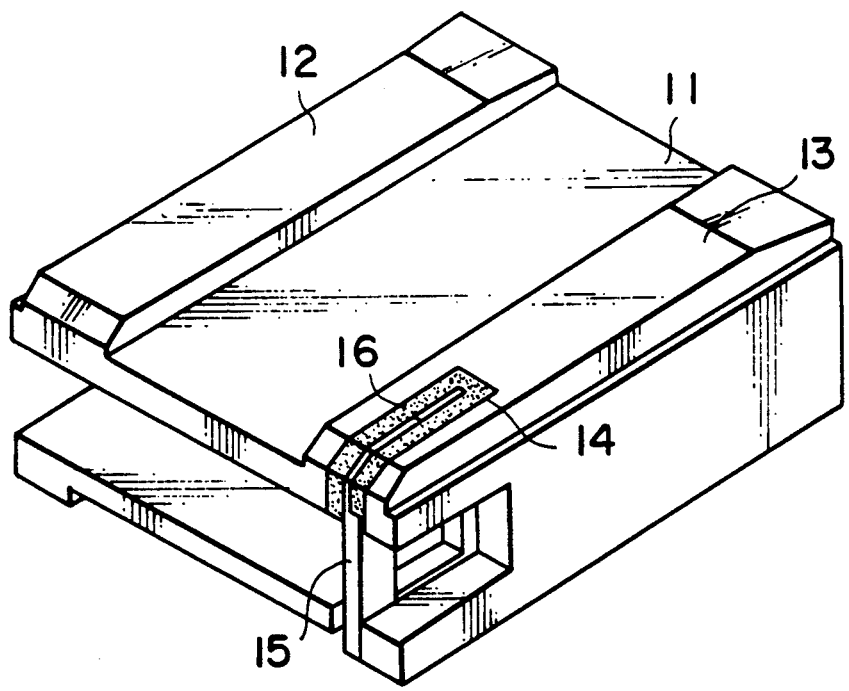
FIG. 1 is a perspective view showing a flying-type composite magnetic head comprising a magnetic head according to one embodiment of the present invention.

FIG. 1 shows the entire structure of a flying-type composite magnetic head comprising the magnetic core according to one embodiment of the present invention. The flying-type composite magnetic head comprises a non-magnetic slider 11, a pair of side rails 12, 13 extending on both lateral side ends of the slider 11, a slit 14 extending in one side rail 13, a magnetic core 15 embedded in the slit 14 and a glass portion 16 for fixing the magnetic core 15 in the slit 14. Incidentally, the slider 11 is desirably made of a non-magnetic ceramic such as $CaTiO_3$ having a thermal expansion coefficient of $105\text{--}115 \times 10^{-7}/°$ C. and a porosity of 0.5 % or less.

Figure 2:
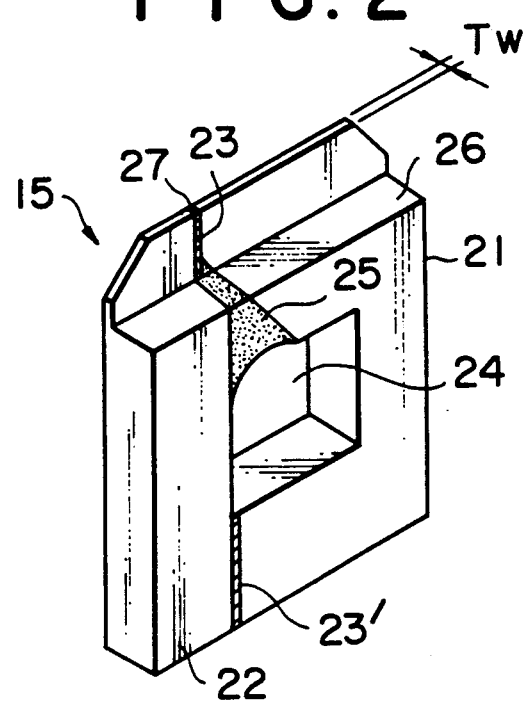
FIG. 2 is a perspective view showing one example of a magnetic core to be assembled in the flying-type composite magnetic head of FIG. 1.

FIG. 2 is an enlarged perspective view of the magnetic core 15. The magnetic core 15 is constituted by a C-shaped core piece 21 and an I-shaped core piece 22 both made of Mn-Zn ferrite, and a first Fe-Al-Si thin layer 23 formed on the I-shaped core piece 22. The I-shaped core piece 22 may also be formed with a second Fe-Al-Si thin layer 23'. A space or a window 24 for coil-winding is defined by the C-shaped core piece 21 and the I-shaped core piece 22, and an upper portion of the coil-winding window 24 is filled with a first glass portion 25 for bonding the C-shaped core piece 21 and the I-shaped core piece 22.

The magnetic core 15 is provided in its track surface with a notch 26 extending longitudinally of the magnetic core 15 for defining or restricting a track width Tw. With this notch 26, the track width Tw of a magnetic gap 27 can be set arbitrarily. Incidentally, the magnetic gap 27 is provided with a gap length-defining layer such as an $SiO_2$ layer, etc. formed by sputtering, etc.

Figure 3:
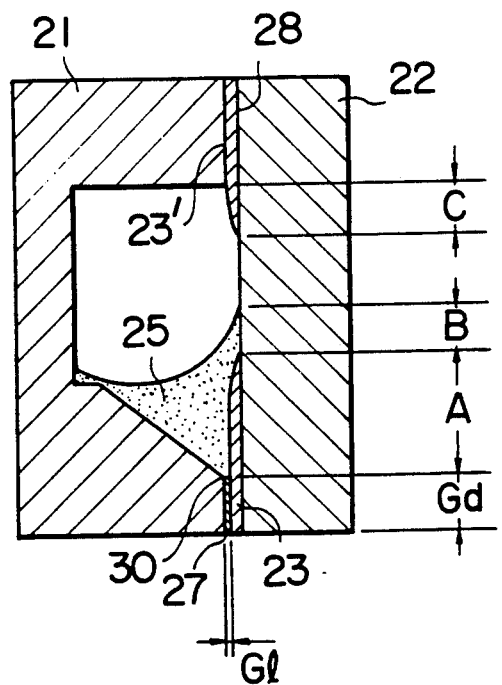
FIG. 3 is a vertical cross-sectional view of the magnetic core of the present invention.

FIG. 3, which is a vertical cross-sectional view of the magnetic core shown in FIG. 2, shows the relations between the core pieces 21, 22 and the thin magnetic layers 23, 23' and a bonding portion 25. This magnetic core generally has a shape as shown below:

| | |
|---|---|
| Track width Tw | 13–20 μm |
| Magnetic gap length Gl | 0.5–0.8 μm |
| Magnetic gap depth Gd | 2–15 μm |

| -continued | |
|---|---|
| Core width | 150–170 μm |

The first thin magnetic metal layer 23 in the magnetic gap 27 usually has a thickness of 2–4 μm or so. It also extends inwardly by a length A from an inner end (apex) 30 of the magnetic gap 27, and has an inner end existing inside an inner end of the bonding glass portion 25 by a length B. In the present invention, A should be 10 μm or more, and B should be 15 μm or more for the reasons set forth below in detail.

Figure 4:
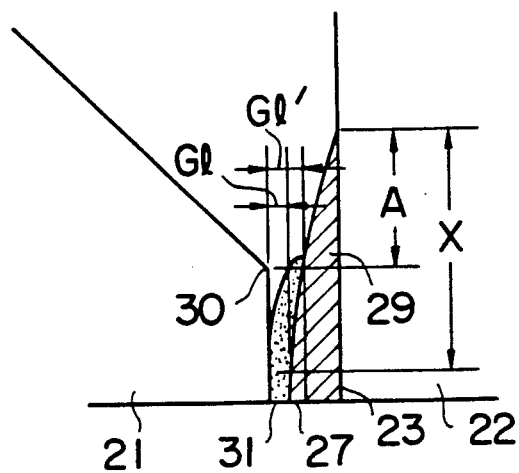
FIG. 4 is a partial enlarged view of a magnetic gap portion of the magnetic core shown in FIG. 3.

FIG. 4 shows a magnetic gap 27 in which the thin layer 23 does not have a sufficient length. In this case, since the thin layer 23 extends from the apex 30 of the C-shaped core piece 21 by a length A, which is shorter than 10 μm, the gradually thinning (tapered) end portion of the thin layer 23 reaches inside the magnetic gap 27. Therefore, the magnetic gap 27 has a gap length G1 which differs between its inner end and its outer end. More specifically, the magnetic gap defined by the $SiO_2$ thin layer 31 has a desired length G1 at an outer end portion thereof, but the gap length increases to G1' toward the inner end portion of the magnetic gap 27. Accordingly, the magnetic head does not show normal characteristics. The cause is that the thin magnetic metal layer 23 has an end portion 29 which is gradually thinning toward inside the magnetic core. Since a length X of the gradually thinning end portion 29 is usually 10 μm or so when a masked sputtering method is employed, the length A extending from the apex 30 should be 10 μm or more.

The magnetic thin layer 23 extending from the magnetic gap 27 should be completely covered by the bonding glass portion 25. Otherwise, due to heat at the time of bonding the core pieces or at the time of fixing the magnetic core to the slider, the thin magnetic layer 23 tends to peel off, and the core pieces tend crack. This tendency can be suppressed by the bonding glass portion 25. The distance B between the inner end of the thin magnetic layer 23 and the inner end of the bonding glass portion 25 is generally required to be 15 μm or more. When it is shorter than 15 μm, the bonding glass portion 25 cannot provide sufficient effect of preventing the peeling of the thin layer 23. Incidentally, in the case of a magnetic core of 1.4 mm×1.6 mm×0.16 mm, the distance between the inner end of the bonding glass portion and the apex 30 is 0.2–0.3 mm or so.

The magnetic core may have a second thin metal layer 23' in a back gap 28. The second thin magnetic metal layer 23' extends from the back gap by a length C, which is generally between −50 μm and 100 μm. When C is less than −50 μm, namely when a space due to the reduced thickness of the second thin magnetic layer 23' exists in the back gap 28, the magnetic core has a reduced circuit efficiency. However, since the back gap 28 usually has a length of 400 μm or so, which is much larger than the magnetic gap depth Gd, a slight space less than 50 μm in length does not substantially pose any problem. On the other hand, when the thin magnetic layer 23, extends more than 100 μm from the back gap 28, it is likely to peel off. The preferred length C is 0–70 μm. When there is the second magnetic layer 23' in a back gap, the C-shaped core piece 21 contacts the I-shaped core piece 22 with a very small gap.

This magnetic head can be produced by the following steps. First, ferrite blocks for producing the I-shaped core piece and the C-shaped core piece are prepared. These ferrite blocks are desirably made of Mn-Zn ferrite having high Bs and extremely high permeability at high frequency. In addition, to reduce voids in the glass which tend to appear during the process of glass bonding, the ferrite blocks are desirably given high density by means of a hot isostatic pressing method. Particularly preferred is Mn-Zn polycrystalline ferrite with $B_1 = 4700$–5400 G, Hc=0.1–0.2 Oe' a permeability of 800–1300 at 5 MHz, a porosity of 0.5% or less and a thermal expansion coefficient of $105$–$130 \times 10^{-7}/°$ C. However, a single crystal ferrite can be used instead of the polycrystalline ferrite.

Either one of the core pieces is provided with a thin magnetic metal layer. For easiness, the metal layer is formed on the I-shaped core piece. The preferred thin magnetic metal layer is an Fe-Al-Si thin layer formed by sputtering. As sputtering conditions, 5–12 mTorr of Ar gas pressure is desirable to maintain stable discharge. To prevent the cracking of an Fe-Al-Si alloy target due to a temperature increase and to obtain a thin film formation speed of about 800 Å/min, electric power is desirably 600–1200 W in the case of a target of 150 mm in diameter. To achieve high permeability, the composition of the Fe-Al-Si layer is desirably 83–86% of Fe, 5–8% of Al and 8–11% of Si by weight. To obtain a small magnetostriction constant, it is desired that Fe is 83.5–85% Al is 5–7% and Si is 9–10.5% by weight. To improve its corrosion resistance, the Fe-Al-Si thin layer may contain a small amount of additives. In this case, it is desired to add 2 weight % or less of Ti, Ru, Cr, etc. alone or in combination.

The formation of the Fe-Al-Si thin layer partially on the I-shaped core piece is conducted by using a masked sputtering method. As shown in FIGS. 9–11, this method is generally conducted by using a combination of a core block holder 93 and a mask 91 having openings through which the thin magnetic metal layers are formed on each ferrite core block 92. The size and position of each opening in the mask is determined depending upon the size and position of each metal layer to be formed on the core block.

Figure 5:
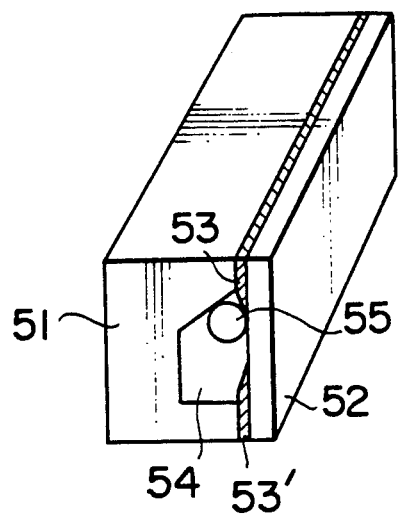
FIG. 5 is a perspective view showing the assembled core blocks whose coil-winding window receives a glass rod for bonding the core blocks.

Next, as is shown in FIG. 5, the I-shaped core block 52 coated with the Fe-Al-Si thin layers 53, 53' are brought into contact with the C-shaped core block 51, and a glass rod 55 is inserted into the resulting window 54 for coil winding and melted therein. In this case, it is preferable that the bonding glass has a softening point of 540–630° C. and a thermal expansion coefficient of $94$–$103 \times 10^{-7}/°$ C.

As the bonding glass (first glass) showing such characteristics, there may be many combinations of PbO-SiO as main components and other various components. The experiments of the inventors have revealed that: a glass composition (a) comprising $PbO$-$SiO_2$ and one or more alkali metal oxides ($K_2O$, $Li_2O$, $Na_2O$, etc.), a glass composition (b) comprising $PbO$-$SiO_2$-$B_2O_3$ and one or more alkali metal oxides, and a glass composition (c) comprising $PbO$-$SiO_2$-$B_2O_3$-$Al_2O_3$ and one or more alkali metal oxides are suitable. In these glass compositions (a), (b), the preferred compositions are, by weight, 28–49% of $SiO_2$, 44–59% of PbO and 7–13% of at least one alkali metal oxide for (a), or 28–49% of $SiO_2$, 5–15% of $B_2O_3$, 7–13% of at least one alkali metal oxide and balance substantially PbO for (b). The last composition (c) is 28–49% of $SiO_2$, 5–15% of $B_2O_3$, 5–12% of $Al_2O_3$, 7–13% of at least one alkali metal oxide and the balance substantially PbO. Particularly a preferred examples of the first glass is by weight % 40 PbO-37 $SiO_2$-

13 $B_2O_3$-10 $Na_2O$ which has a softening point of 560° C. and a thermal expansion coefficient of $95 \times 10^{-7}$/° C. When the magnetic core pieces are bonded with such first glass, the bonding strength of the magnetic core is as high as 5 kg/mm$^2$, without causing any corrosion of the Fe-Al-Si thin layer. $SiO_2$ has a function to prevent the corrosion of the glass in a highly humid condition. However when $SiO_2$ is excessive, the wettability of the Fe-Al-Si thin layer or the ferrite core by the glass decreases, resulting in insufficient bonding strength. $Al_2O_3$ has a function to prevent the discoloration of the glass at high temperature. However, when it is excessive, the glass has too high a softening point, making it unable to achieve easy bonding. In addition, alkali metal oxides have a function to adjust the fluidity of the glass.

The bonding of the core blocks with such first glass is conducted at 700-760° C. By cutting the bonded blocks and providing each cut piece with a notch for restricting a track width Tw, a magnetic core can be obtained.

Figure 6:
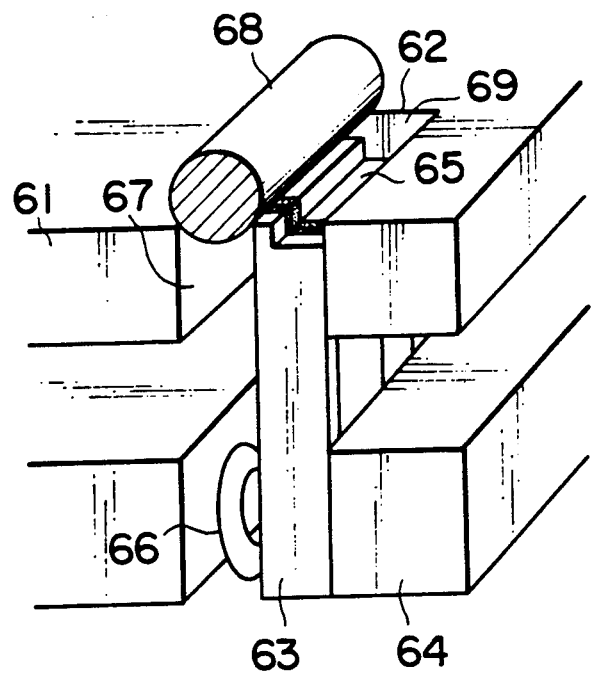
FIG. 6 is a perspective view showing the step of fixing the magnetic core to a slider with a second glass to produce the flying-type composite magnetic head of FIG. 1.

The fixing of this magnetic core to the slit of the slider is conducted as follows. FIG. 6 is a perspective view showing a state in which the bonded magnetic core 63 is placed in a slit 62 of the slider 61, and a glass rod 68 is placed on the slider 61 over the slit 62. Since a notch 65 of the magnetic core 63 faces an outside portion 64 of the slider 61, there are gaps 67, 69 between the magnetic core 63 and the inner surfaces of the slit 62, even when the magnetic core 63 is in forced contact with the inner surface of the outside portion 64. The provisional fixing of the magnetic core 63 in the slit 62 is achieved easily by a spring member 66 forcefully inserted in a gap between one side of the magnetic core 63 and the opposing inner surface of the slit 62. The glass rod 68 is to constitute a second glass portion for fixing the magnetic core 63 to the slit 62. Preferable, the second glass is a glass which has a thermal expansion coefficient of $87-96 \times 10^{-7}$/° C. and a softening point of 370-480° C. or so. The glass composition showing such properties is 70-83% of PbO, 3-10% of $Al_2O_3$, 4-10% of $SiO_2$ and 4-10% of $B_2O_3$ by weight. By heating this glass rod 68 at a temperature of 500-580° C., it flows into the gaps 67, 69.

One example of a particularly preferred glass composition for the second glass portion is 80 PbO-7 $Al_2O_3$-6 $SiO_2$-7 $B_2O_3$ (by weight %). This glass has a thermal expansion coefficient of $93 \times 10^{-7}$/° C. and a softening point of 440° C. By conducting the fixing of the magnetic core with this second glass at 530° C., fixing without cracks can be achieved.

After fixing the magnetic core 43 in the slit 42, the air-bearing surface of the magnetic head is ground and mirror-finished.

After fixing the magnetic core to the slider, an air-bearing surface of the magnetic head is ground and lapped to provide the completed magnetic head.

The present invention will be explained in further detail by means of the following Examples.

EXAMPLE 1

To produce a magnetic core having a structure shown in FIG. 2, a C-shaped core block and an I-shaped core block were produced from Mn-Zn polycrystalline ferrite. The Mn-Zn polycrystalline ferrite was compressed by a hot isostatic pressing method to have a porosity of 0.1%, and it had magnetic properties in which $B_{10}$=5100 G, Hc=0.15 Oe and permeability at 5 MHz=950. Further it had a thermal expansion coefficient of $115 \times 10^{-7}$/° C.

Each of the C-shaped core block and the I-shaped core block was formed by using a peripheral slicer, and ground with a flat grinder and then lapped. After lapping, each core block was boiled in trichloroethylene, and then subjected to ultrasonic cleaning in trichloroethylene, acetone and alcohol, respectively. After that, it was boiled in freon and finally washed in a freon vapor.

Fe-Al-Si thin layers having various widths were formed on the I-shaped core block at positions corresponding to a magnetic gap and a back gap by a magnetron sputtering apparatus. The electric power of the magnetron sputtering apparatus was 0.8 kW, its argon pressure was 8 mTorr, and its substrate temperature was 200° C. The Fe-Al-Si thin layer had a composition of 85% Fe, 6% Al and 9% Si by weight. It also had a thickness of 2.9 μm. This thin layer had the following characteristics: Bs=11,000 G, Hc=0.3-0.5 Oe, permeability at 5 MHX=1,000-2,000 and magnetostriction constant=$+1 \times 10^{-6}$.

Next, the I-shaped core block formed with the Fe-Al-Si thin layers was then placed in an RF sputtering apparatus to produce an $SiO_2$ gap length-defining layer of 0.5 μm in thickness on the Fe-Al-Si thin layer at an electric power of 0.3 kW, argon pressure of 5 mTorr and substrate temperature of 150° C.

A first glass for bonding the C-shaped core piece and the I-shaped core piece had the following composition:

| | |
|---|---|
| PbO | 40 weight % |
| $SiO_2$ | 37 weight % |
| $B_2O_3$ | 13 weight % |
| $Na_2O$ | 10 weight % |

This first glass had a softening point of 560° C. and a thermal expansion coefficient of $95 \times 10^{-7}$/° C. The bonding of the core blocks with the first glass was conducted by heating them in an electric furnace filled with a nitrogen gas to 700° C at a heating rate of 300° C./hr, and keeping them at 700° C. for 30 minutes.

The core blocks thus bonded were ground by a flat grinder and then lapped, and finally cut into each magnetic core of 152 μm in thickness by a wire saw.

Next, to restrict the track width Tw of the resulting magnetic core, it was notched by a high-rigidity dicer in a width of 138.5 μm and a depth of 200 μm.

The magnetic core thus notched had the following structure:

| | |
|---|---|
| Thickness of the magnetic core Cw | 152 μm |
| Track width Tw | 13.5 μm |
| Gap length Gl | 0.55 μm |
| Gap depth Gd* | 5.0 μm |
| Thickness of bonding glass Gw about | 200 μm |

Note*:
Gap depth was determined after assembled in a magnetic head and lapped.

With respect to the magnetic core thus produced, the relations between a length A of the first thin magnetic layer and the dimensional precision of the magnetic gap length Gl, the relations between a length B of the first thin magnetic layer and the peeling of the first magnetic layer and the cracking of the core pieces, and the relations between a length C of the second thin magnetic layer and the peeling of the second magnetic layer and the cracking of the core pieces were investigated. The results are shown in Tables 1–3.

TABLE 1

| Length A (μm)[1] | Dimensional[2] Precision of Gl |
|---|---|
| −10 | X |
| −5 | X |
| ±0 | Δ |
| +5 | Δ |
| +10 | O |
| +20 | O |
| +50 | O |

Note:
[1] "−" means that the magnetic layer exists inside the apex, and "+" means that it extends over the apex.
[2] X: Gl is outside the predetermined length range by the tapering of an end portion of the magnetic layer.
Δ: Gl is almost within the predetermined length range.
O: Gl is completely within the predetermined range despite the tapering of the magnetic layer end portion.

TABLE 2

| Length B[1] (μm) | Cracking of[2] Core Pieces | Peeling of[3] Magnetic Layer |
|---|---|---|
| +50 | O | O |
| +30 | O | O |
| +15 | O | O |
| ±0 | Δ | Δ |
| −15 | Δ | X |
| −30 | X | X |
| −100 | X | X |

Note:
[1] "−" means that the magnetic layer exists inside the apex, and "+" means that it extends over the apex.
[2] O: No cracking in the core pieces.
Δ: Some core pieces were cracked.
X: All core pieces were cracked.
[3] O: No peeling of the magnetic layer.
Δ: Partial peeling of the magnetic layer.
X: 80% or more of the magnetic layer peeled off.

TABLE 3

| Length C[1] (μm) | Cracking of[2] Core Pieces | Peeling of[3] Magnetic Layer |
|---|---|---|
| +300 | X | X |
| +150 | Δ | Δ |
| +100 | O | O |
| +50 | O | O |
| ±0 | O | O |
| −50 | O | O |

Note:
[1] "−" means that the magnetic layer exists inside the apex, and "+" means that it extends over the apex.
[2] O: Less than 5% of the core pieces were cracked.
Δ: Some core pieces were cracked (5% or more).
X: All core pieces, from which magnetic layers did not peel off, were cracked.
[3] O: No peeling of the magnetic layer.
Δ: Partial peeling of the magnetic layer.
X: Peeling took place over the entire area of the magnetic layer.

As is clear from the above results, the length A should be 10 μm or more, the length B should be 15 μm or more and the length C should be 100 μm or less.

EXAMPLE 2

A slider made of a $CaTiO_3$ ceramic having a thermal expansion coefficient of $108 \times 10^{-7}/°C$ and a porosity of 0.15% was formed with a slit of 1.5 mm in length and 220 μm in width at one end of one side rail thereof, and the magnetic core was provisionally fixed in the slit with a leaf spring. It was then fixed with the following second glass:

| PbO | 78 weight % |
|---|---|
| $SiO_2$ | 6 weight % |
| $Al_2O_3$ | 7 weight % |
| $B_2O_3$ | 7 weight % |

The second glass had a thermal expansion coefficient of $91 \times 10^{-7}/°C$ and a softening point of 440° C. This glass was heated in an electric furnace filled with N at a heating rate of 300° C./hour, and kept at a temperature of 540° C. for 30 minutes, so that it flowed into gaps between the magnetic core and the inner surfaces of the slit. The magnetic head thus produced was ground and lapped with a mirror-finishing grinder and a lapping machine on its air-bearing surface, thereby providing a flying-type composite magnetic head. By these grinding and lapping operations, the notch finally had a depth D of 75 μm. The magnetic gap depth Gd was 5.0 μm after grinding and lapping the air-bearing surface. Incidentally, the gaps between the inner surfaces of the slit and both sides of the magnetic core were 68 μm and 138.5 μm, respectively.

Figure 7:
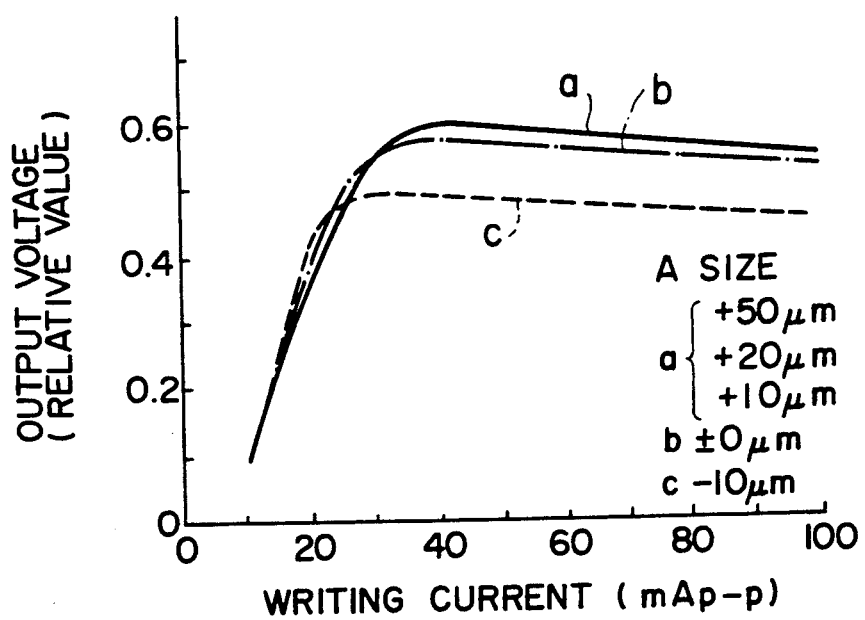
FIGS. 7 and 8 are graphs showing the relations between writing current and reproduced output voltage.
Figure 8:
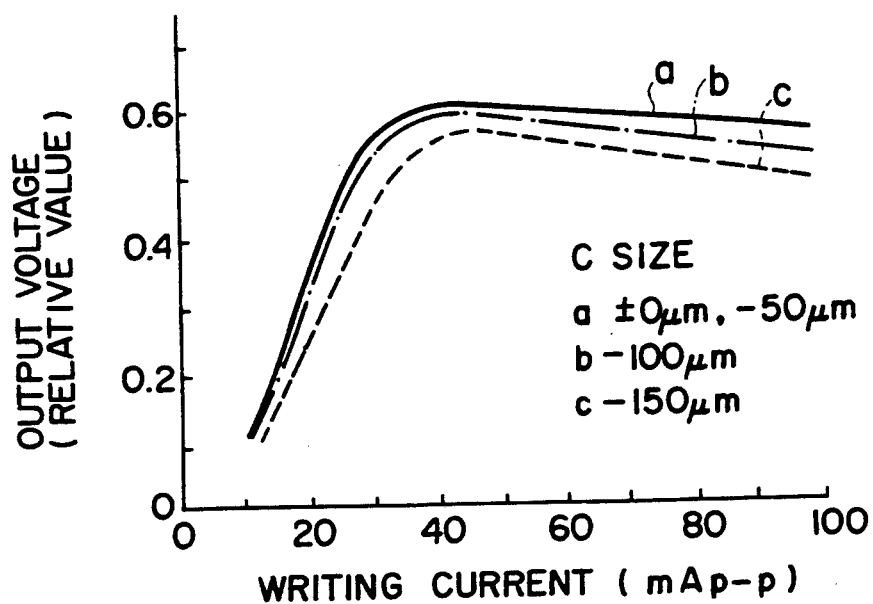

Reproduced output characteristics at 5 MHz (relations between writing current and output voltage) were measured on this magnetic head, by using a 5.25-inch magnetic disk having a Co-Ni sputtered recording layer (Hc=1150 Oe), with a floating height of 0.3 μm and a peripheral speed of 12.1 m/sec. Incidentally, the winding of the magnetic head was 48 turns. The results are shown in the graphs of FIGS. 7 and 8.

From the above comparisons, it is clear that the magnetic head shows excellent reproduced output characteristics when the length A is 10 μm or more. In a case where the second magnetic thin layer is used, the length C is between −50 μm and +100 μm.

As described above in detail, since the magnetic core of the present invention is provided with thin magnetic metal layers whose dimensions are within the particular ranges, it shows good characteristics without suffering from the peeling of the magnetic layers and the cracking of the core pieces.

What is claimed is:
1. A magnetic core for a flying-type composite magnetic head comprising:
    (a) a pair of core pieces;
    (b) a glass portion for bonding said pair of core pieces;
    (c) a window defined by said pair of core pieces;
    (d) a magnetic gap defined by said pair of core pieces on one side of said window; and
    (e) a thin magnetic metal layer formed on at least one of opposing surfaces of said core pieces from an outer end of said magnetic gap to said window, said thin magnetic metal layer extending by 10 μm or more beyond an inner end of said magnetic gap and terminating by 15 μm or more inside an inner end of said bonding glass portion.
2. The magnetic core according to claim 1, wherein said pair of core pieces includes an I-shaped core piece and a C-shaped core piece and wherein a second thin magnetic metal layer is formed on at least one of opposing surfaces of said pair of core pieces in a back gap defined by pair of core pieces on the other side of said window, said second thin magnetic metal layer having an inner end existing between at most 50 μm inside an inner end of said back gap and at most 100 μm from the inner end of said back gap.
3. The magnetic core according to claim 2, wherein both of said thin magnetic metal layers are made of an Fe-Al-Si alloy.
4. The magnetic core according to claim 1, wherein said pair of core pieces includes an I-shaped core piece and a C-shaped core piece, and said thin magnetic metal layer is made of an Fe-Al-Si alloy.

* * * * *

UNITED STATES PATENT AND TRADEMARK OFFICE
CERTIFICATE OF CORRECTION

PATENT NO. : 4,999,726

DATED : March 12, 1991

INVENTOR(S) : Goto et al.

It is certified that error appears in the above-identified patent and that said Letters Patent is hereby corrected as shown below:

The title page [56] References Cited:

Please ADD the following U.S. patents:

```
--3,562,444   2/1971   H.M. Hoogendoorn, et al. ...360/103
  3,823,416   7/1974   M.W. Warner ................360/122--
```

Please ADD the following foreign patents:

```
--58-14311    1/1983   Japan
  60-154310   8/1985   Japan
  61-199217   9/1986   Japan
  61-199219   9/1986   Japan--
```

Col. 1, line 44, delete "but".

UNITED STATES PATENT AND TRADEMARK OFFICE
CERTIFICATE OF CORRECTION

PATENT NO. : 4,999,726

DATED : March 12, 1991

INVENTOR(S) : Goto et al.

It is certified that error appears in the above-identified patent and that said Letters Patent is hereby corrected as shown below:

Col. 2, line 35, should read "Fe-A+-Si= --Fe-A$\ell$-Si--.

Col. 3, line 30, change "pain" to --pair--;
line 34, after "window" insert a comma;
line 42, change "almost" to --at most--;
line 48, change "tapered)" to --(tapered)--.

Col. 5, line 19, change "Gl" to --$G_\ell$--;
line 22, change "Gl" to --$G_\ell$--;

Col. 6, line 8, change "$B_1$" to --$B_{10}$--; and "Oe'" should read --Oe,--.
line 52, change "SiO" to --$SiO_2$--;
line 67, after "Particularly" insert a comma.

Col. 7, line 35, change "Preferable" to --Preferably--.

UNITED STATES PATENT AND TRADEMARK OFFICE
CERTIFICATE OF CORRECTION

PATENT NO. : 4,999,726  Page 3 of 3
DATED : March 12, 1991
INVENTOR(S) : Goto et al.

It is certified that error appears in the above-identified patent and that said Letters Patent is hereby corrected as shown below:

Col. 8, Second table, line 5, before "200" insert --about--; and delete the sixth line of the table.

Col. 10, line 3, change "N" to --$N_2$--.

Signed and Sealed this

Twenty-sixth Day of January, 1993

Attest:

STEPHEN G. KUNIN

*Attesting Officer*  Acting Commissioner of Patents and Trademarks

REEXAMINATION CERTIFICATE (2524th)
United States Patent [19]
Goto et al.

[11] B1 4,999,726
[45] Certificate Issued    Apr. 4, 1995

[54] MAGNETIC CORE FOR FLYING-TYPE COMPOSITE MAGNETIC HEAD

[75] Inventors: Ryo Goto; Tadafumi Tomitani, both of Mouka; Fumio Nitanda, Fukaya; Manabu Toyoda, Mouka; Makoto Ushijima, Tokyo, all of Japan

[73] Assignee: Hitachi Metals, Ltd., Tokyo, Japan

Reexamination Request:
No. 90/003,186, Aug. 31, 1993

Reexamination Certificate for:
Patent No.: 4,999,726
Issued: Mar. 12, 1991
Appl. No.: 329,324
Filed: Mar. 27, 1989

Certificate of Correction issued Jan. 26, 1993.

[30] Foreign Application Priority Data

Mar. 29, 1988 [JP] Japan ................... 63-75258

[51] Int. Cl.$^6$ ........................... G11B 5/235
[52] U.S. Cl. ............................ 360/120; 360/119; 360/125
[58] Field of Search ............. 360/120, 119, 121, 125

[56] References Cited
FOREIGN PATENT DOCUMENTS 60-85711 6/1985 Japan .
63-46608 2/1988 Japan .
63-32304 3/1988 Japan .

OTHER PUBLICATIONS

Schiller et al., "Chapter 6. Forming a Pattern by Vapor Deposition", *Vacuum Deposition*, pp. 60–67, Aug. 1, 1979, Agne.
Jeffers et al., "Metal-In-Gap Record Head", IEEE Transactions on Magnetics, vol. MAG-18, No. 6, pp. 1146–1148, Nov. 1982.

*Primary Examiner*—John H. Wolff

[57] ABSTRACT

A magnetic core for a flying-type composite magnetic head, including a pair of core pieces, a glass portion for bonding the core pieces, and a thin magnetic metal layer of Fe-Al-Si alloys formed on at least one of opposing surfaces of the core pieces. The thin magnetic metal layer extends by 10 μm or more from an apex of a magnetic gap defined by the core pieces and has an inner end existing by 15 μm or more inside an inner end of the bonding glass portion.

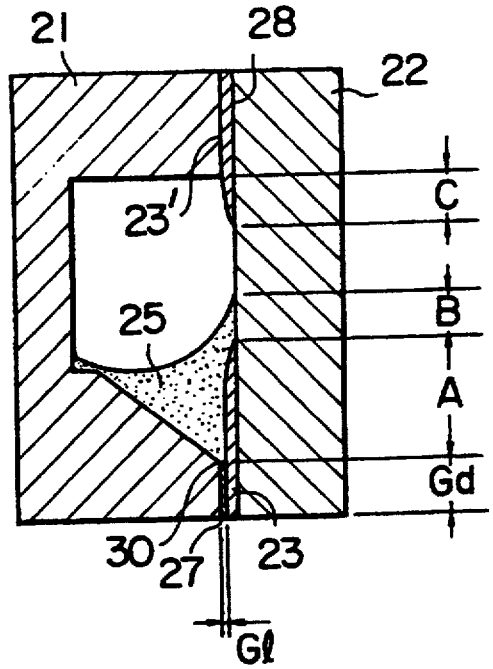

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–4, dependent on an amended claim, are determined to be patentable.

New claims 5–7 are added and determined to be patentable.

1. A magnetic core for a flying-type composite magnetic head comprising:
 (a) a pair of core pieces;
 (b) a glass portion for bonding said pair of core pieces;
 (c) a window defined by said pair of core pieces;
 (d) a magnetic gap defined by said pair of core pieces on one side of said window; and
 (e) a thin magnetic metal layer formed on at least one of opposing surfaces of said core pieces from an outer end of said magnetic gap to said window, said thin magnetic metal layer *having an* extending *portion which extends* by 10 μm or more beyond an inner end of said magnetic gap [and terminating by] , *said glass portion completely covering said extending portion of said thin magnetic layer and being in direct contact with said one of opposing surfaces for a distance of 15 μm or more* [inside an inner end of said bonding glass portion] *beyond said extending portion of the thin magnetic layer, whereby to facilitate a transition from a magnetic film zone to a non-magnetic film zone at said extending portion while maintaining normal output characteristics of said magnetic core and to provide a bonding glass portion sufficient to inhibit peeling of the thin film from said at least one of opposing surfaces and cracking of said core pieces.*

*5. A magnetic core for a flying-type composite magnetic head comprising:*
 *(a) a pair of core pieces;*
 *(b) a glass portion for bonding said pair of core pieces;*
 *(c) a window defined by said pair of core pieces;*
 *(d) a magnetic gap defined by said pair of core pieces on one side of said window; and*
 *(e) a thin magnetic metal layer formed on at least one of opposing surfaces of said core pieces from an outer end of said magnetic gap to said window, said thin magnetic metal layer having an extending portion which extends by 10 μm or more beyond an inner end of said magnetic gap, said glass portion completely covering said extending portion of the thin magnetic metal layer and being in direct contact with said one of opposing surfaces for a distance of 15 μm or more beyond said extending portion of the thin magnetic layer, said extending portion having a tapered portion in which the thickness of said thin magnetic metal layer gradually decreases, whereby to facilitate a transition from a magnetic film zone to a non-magnetic film zone at said extending portion while maintaining normal output characteristics of said magnetic core and to provide a bonding glass portion sufficient to inhibit peeling of the thin film from said at least one of opposing surfaces and cracking of said core pieces.*

*6. A magnetic core for a flying-type composite magnetic head comprising:*
 *(a) first and second core pieces, said first core piece having first and second ends and being generally C-shaped and having a first planar surface area at said first end thereof, said second core piece being generally I-shaped and having a second planar surface area thereon;*
 *(b) a glass portion for bonding said first and second core pieces together with said first and second planar surface area disposed in facing relationship;*
 *(c) a window defined by said core pieces, said second planar surface area having a portion thereof exposed within said window;*
 *(d) a magnetic gap defined between said first and second planar areas; and*
 *(e) a thin magnetic metal layer formed on said second planar area in said gap, said thin magnetic metal layer having an extending portion which extends along said second planar area for 10 μm or more beyond said magnetic gap, said glass portion completely covering said extending portion of the thin magnetic layer and being in direct contact with said second planar area for a distance of 15 μm or more beyond said extending portion of the thin magnetic layer, whereby to facilitate a transition from a magnetic film zone to a non-magnetic film zone at said extending portion while maintaining normal output characteristics of said magnetic core and to provide a bonding glass portion sufficient to inhibit peeling of the thin film from said at least one of opposing surfaces and cracking of said core pieces.*

*7. A magnetic core for a flying-type magnetic head comprising:*
 *(a) a pair of core pieces;*
 *(b) a glass portion for bonding said pair of core pieces;*
 *(c) a window defined by said pair of core pieces;*
 *(d) a magnetic gap defined by said pair of core pieces on one side of said window; and*
 *(e) a thin magnetic metal layer formed by masked sputtering on at least one of opposing surfaces of said core pieces from an outer end of said magnetic gap to said windows, said thin magnetic metal layer having an extending portion which extends by 10 μm or more beyond an inner end of said magnetic gap, said glass portion completely covering said extending portion of the thin magnetic metal layer and being in direct contact with said one of opposing surfaces for a distance of 15 μm or more beyond said extending portion of the thin magnetic layer, whereby to facilitate a transition from a magnetic film zone to a non-magnetic film zone at said extending portion while maintaining normal output characteristics of said magnetic core and to provide a bonding glass portion sufficient to inhibit peeling of the thin film from said at least one of opposing surfaces and cracking of said core pieces.*

* * * * *